Sept. 5, 1961 J. O'BROCHTA 2,999,095
8-HYDROXYQUINOLINE MANUFACTURE
Filed Oct. 19, 1959
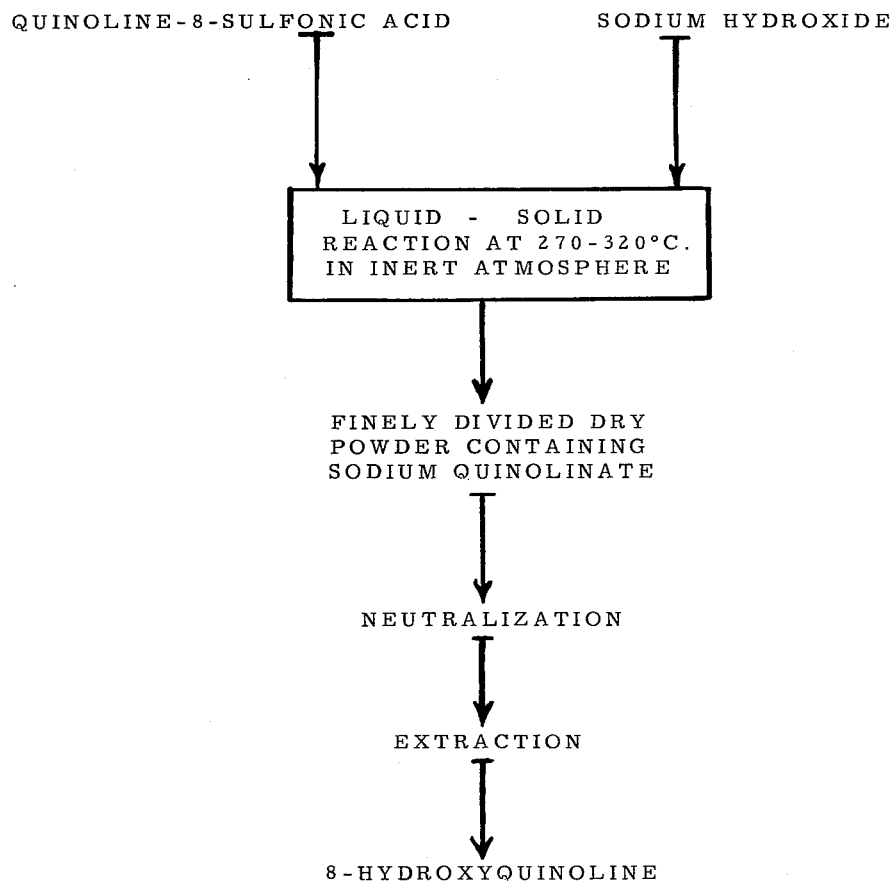
INVENTOR.
JOHN O'BROCHTA
BY J.E. Armstrong
HIS ATTORNEY

2,999,095
8-HYDROXYQUINOLINE MANUFACTURE
John O'Brochta, Pittsburgh, Pa., assignor to Koppers Company, Inc., a corporation of Delaware
Filed Oct. 19, 1959, Ser. No. 847,399
6 Claims. (Cl. 260—289)

This invention relates to the manufacture of 8-hydroxyquinoline. In one specific aspect, it relates to an improved fushion process for making 8-hydroxyquinoline from quinoline-8-sulfonic acid.

8-hydroxyquinoline has considerable commercial significance as a chemical intermediate. The copper chelate of 8-hydroxyquinoline is one of the most effective fungistats known, and other derivatives are of increasing commercial interest.

The preparation of 8-hydroxyquinoline from quinoline-8-sulfonic acid has been known for many years. Otto Fischer, in U.S. Patent 270,045, described the preparation of 8-hydroxyquinoline by reacting a molten mass comprising one part quinoline-8-sulfonic acid and from 1–2 parts by weight solid sodium hydroxide. From a practical standpoint, the Fischer process has two major drawbacks. First, a very large excess of sodium hydroxide, i.e. 5.25–10.5 moles of sodium hydroxide per mole of quinoline-8-sulfonic acid, is required. Second, considerable difficulty is experienced in the handling of the fused mass after reaction has taken place; thus the handling losses involved in carrying out the process are abnormally high. Such handling losses can only be reduced at the expense of materially increased labor costs. In the Fischer process, after the reaction has taken place, the resulting mass is a thick paste of a consistency resembling cement just prior to hardening. If heating is continued to solidify the mass, there is appreciable degradation of product. Moreover, the resulting solid mass presents a very considerable handling problem.

In the years that followed Fischer's development numerous methods were devised to overcome the physical difficulties accompanying the Fischer process. One process involves mixing quinoline-8-sulfonic acid with a large excess of sodium hydroxide dissolved in a very substantial amount of water. The reaction mixture is subsequently heated at a comparatively low temperature, e.g. from 190–200° C., until the mix becomes fused. After reaction is complete, the molten material is allowed to solidify and is broken up. It is then dissolved in hydrochloric acid and the 8-hydroxyquinoline is steam distilled to purify the same. According to Grier et al., U.S. Patent 2,489,530, actual experience showed that the yields obtainable by this process are only from 20–30%.

Grier et al. devised a method to eliminate the difficulties that the art had experienced in connection with the fusion technique wherein the reaction between quinoline-8-sulfonic acid and sodium hydroxide takes place in the semisolid phase without fusion of the constituents. In the Grier process the proportion or ratio of sodium hydroxide to quinoline-8-sulfonic acid is relatively critical and the amount of said sodium hydroxide by weight is 1.2–2 parts for each part of the quinoline-8-sulfonic acid. Grier et al. eliminated fusion by limiting the water content of the reaction mixture to not over 4% and by controlling the reaction temperature within the critical range of 250–290° C. It became possible, using the Grier et al. process, to obtain appreciably higher yields (in the order of magnitude of 90% and higher) than those that could be obtained using the previously known processes. Unfortunately, the Grier process did not eliminate certain of the difficulties attendant Fischer's process. Success of the Grier process is based in part upon the consumption of a large excess of caustic (slightly higher than Fischer's minimum requirement) and the product is obtained in the form of a solid mass which must be broken up into relatively small pieces by physical means. Although the solid mass of Grier is somewhat easier to handle than the semi-solid paste of Fischer, removal of the solid mass from the reaction vessel still entails measurable handling losses coupled with high labor costs.

Quite surprisingly, I have discovered a novel process, using a fusion technique in contrast with the semi-solid reaction of Grier, whereby the amount of caustic consumed is 25–50% less than the minimum requirement of the prior art processes. Furthermore, the reaction product of my novel fusion method is obtained in the form of a finely divided dry powder which can be removed from the reaction vessel by a simple dumping operation, thereby virtually eliminating the handling losses and labor costs which plagued the methods of the prior art. Although the yields obtainable by my process are slightly lower than those of Grier et al., from an overall standpoint my process is more economical to operate.

In accordance with the invention quinoline-8-sulfonic acid is intimately admixed with sodium hydroxide containing a quantity of water sufficient to maintain the fluidity of the sodium hydroxide at the selected reaction temperature until the completion of the reaction. The weight ratio of sodium hydroxide to quinoline-8-sulfonic acid is about 0.5–0.75:1. The reaction mixture is heated at a temperature of 270–320° C. in an inert atmosphere until a dry powder is formed and 8-hydroxyquinoline is recovered from said powder.

My invention can be more easily understood by referring to the accompanying drawing, which is a simplified flow sheet of an embodiment of the invention.

In the drawing, solid quinoline-8-sulfonic acid and liquid sodium hydroxide are reacted in an inert atmosphere at 270–320° C., using a weight ratio of sodium hydroxide to quinoline-8-sulfonic acid of 0.5–0.75:1 (not shown). Upon completion of the reaction, a finely divided dry powder containing sodium quinolinate is formed. 8-hydroxyquinoline is recovered therefrom by neutralization and extraction.

The quinoline-8-sulfonic acid used in the invention is prepared by reacting quinoline with oleum, preferably according to the method described in my copending application S.N. 847,398.

The sodium hydroxide used is preferably in the form of a 70% aqueous solution, which is commercially available. The amount of water present with the sodium hydroxide is relatively unimportant, except that there must be present a quantity of water sufficient to maintain the fluidity of the sodium hydroxide at the selected reaction temperature. In the lower portion of the temperature range useful in the invention the presence of 10–20% water is required to provide at all times a molten mass, thus providing for the liquid-solid reaction between sodium hydroxide and quinoline-8-sulfonic acid. As the reaction temperature is increased, water is vaporized from the reaction mixture. At 310° C. solid caustic becomes molten and no water is required. Any water which is initially present will be driven off as that temperature is reached. Thus, the presence of water serves only to lower the temperature at which the sodium hydroxide becomes molten.

The weight ratio of sodium hydroxide to quinoline-8-sulfonic acid is critical and it ranges between about 0.5–0.75:1. If the ratio is below about 0.5:1 there is a considerable amount of tar formation during the reaction and the yield of product is substantially diminished. Above about 0.75:1 it is impossible to obtain the reaction product in the form of pulverulent granules or powder, a result which is unexpected and which is essential to the economic operation of my process.

It is essential to conduct the reaction in an inert atmosphere, such as nitrogen or dry steam. If an inert atmosphere is not present, considerable tar formation and charring occurs and the yield of product is markedly decreased. See comparative Examples III, IV and V. The inert atmosphere serves to prevent oxidation of the reaction product and to permit the use of the relatively small quantity of caustic. As I have already noted, the use of the small quantity of caustic is essential in order to provide a reaction product in the form of a dry uncongealed powder, a result heretofore unobtainable using prior art techniques. Other inert gases such as argon and helium may serve as the inert atmosphere.

The reaction temperature is relatively critical and may be varied between about 270–320° C. Below about 270° C. the reaction is too slow and above about 315–320° C. some degradation of the product results. Preferred reaction temperatures range between about 290 and 310° C.

The reaction time varies generally between about 5 and 45 minutes and is controlled by the particular temperature selected. The completion of the reaction is indicated by an abrupt change in the reaction mass from a molten mixture to a dry powder. Preferred reaction time for batch operation varies between about 15 and 20 minutes. For continuous operation it is desirable to use higher temperatures and to provide a reaction time of about 5–10 minutes.

At the completion of the reaction the reaction mass comprises sodium quinolinate, sodium sulfite, and unreacted sodium hydroxide. The separation of the sodium quinolinate from the reaction mixture is greatly facilitated by the novelly small quantity of excess caustic that remains after the reaction is complete. Since the reaction mass is in the form of tractable pulverulent granules, it is easily discharged from the reactor by a simple dumping operation, rather than the cumbersome and costly crushing and scraping operations heretofore used.

The dry, powdery reaction mass is discharged into water. There is no upper limit on the amount of water used, but at least two pounds of water per pound of reaction mass must be present to prevent the precipitation of sodium sulfite, which interferes with the recovery procedure. 8-hydroxyquinoline is released from the resulting solution by adding a strong mineral acid, such as sulfuric acid, thereto. The degree of neutralization with the mineral acid is important. I have found that the acid should be added to the solution until a pH of about 8–8.5 is obtained. Below about pH 8 the mineral acid tends to decompose the sodium sulfite, thus releasing a considerable amount of $SO_2$. The free $SO_2$ causes severe corrosion problems and tends to adversely affect the product. Above about pH 8.5 the 8-hydroxyquinoline is incompletely released from its sodium salt, which is water soluble and not amenable to practical recovery.

The 8-hydroxyquinoline can be recovered from the solution using conventional means such as steam distillation. In order to obtain an extremely pure product, i.e. one having a melting point of about 73.6–74.6° C., I prefer to use an extraction technique which involves admixing the neutralized solution with a water-immiscible aromatic solvent such as toluene, benzene, xylene, nitrobenzene, and the like. The aqueous layer is then decanted and the organic layer is distilled to provide extremely pure 8-hydroquinoline. The pure product is obtained in yields of about 83–90%.

My invention is further illustrated by the following examples.

*Example I*

A 1.69 pound quantity of 70% aqueous sodium hydroxide was heated to a temperature of 290° C. and 1.72 pounds of quinoline-8-sulfonic acid was added thereto, thus providing a weight ratio of reactants of 0.69:1. The reaction mixture was blanketed with dry steam and after about 15 minutes the molten mass abruptly changed to a yellow powder. The powder was held for 5 minutes at 290° C. and thereafter dumped into 5.68 pounds of water. To the aqueous solution was added 0.66 pound of 66° Baumé sulfuric acid. The resulting mixture had a pH of 8 and a temperature of 30° C. 5.43 pounds of toluene was added thereto and the mixture was allowed to stand for about 3 hours. It was thereafter clarified by filtration and the aqueous layer (7.80 pounds) was decanted therefrom. The 6.51 pounds of toluene extract was distilled, first at atmospheric pressure to remove the toluene (at a temperature of 110° C.) and then under reduced pressure of 10 mm. of Hg at a temperature of 126° C. to recover one pound of 8-hydroxyquinoline, melting at 74° C. The product thus obtained represented an 85% yield of 99.5% pure product.

*Example II*

A 6.18 pound quantity of 70% aqueous sodium hydroxide was heated to a temperature of 271° C. and 2.78 pounds of quinoline-8-sulfonic acid was added thereto, thus providing a weight ratio of reactants of 1.56:1. The molten reaction mixture was stirred at 271–280° C. for 20 minutes, at which time the reaction product became a semi-solid yellowish paste. This paste was held at 280° C. for 5 minutes and thereafter discharged from the reactor. The product could not be dumped. It had to be removed from the reactor by scraping, followed by a water leach. The discharged reactor mass was then processed as in Example I. The yield of refined 8-hydroxyquinoline was 88%.

*Example III*

A 1.69 pound quantity of 70% aqueous sodium hydroxide was heated to a temperature of 300° C. and 1.72 pounds of quinoline-8-sulfonic acid was added thereto, thus providing a weight ratio of reactants of 0.69:1. The reaction mixture was heated at 300–315° C. without blanketing with dry steam or inert gas. After 5 minutes of mixing at this temperature strong fuming became evident. Heating was quickly discontinued. The product mix began to glow and was largely charred before it could be quenched with water. The experiment was abandoned.

*Example IV*

A 4.42 pound quantity of 70% aqueous sodium hydroxide was heated to a temperature of 300° C. and 3.16 pounds of quinoline-8-sulfonic acid was added thereto, thus providing a weight ratio of reactants of 0.98:1. The reaction mixture was stirred at 300–315° C. while exposed to the air. After 15 minutes of stirring and heating the initial melt turned to a brownish black sticky mass. It was cooled to below 200° C. and then discharged from the reactor by chipping and finally leaching with water. The resulting solution was worked up as in Example I. About 0.35 pound of a tarry residue was obtained during subsequent vacuum distillation of the hydroxy quinoline. The yield of refined 8-hydroxyquinoline was 63%.

*Example V*

A 3.53 pound quantity of 70% aqueous sodium hydroxide was heated to a temperature of 250° C. and 3.69 pounds of quinoline-8-sulfonic acid was added thereto, thus providing a weight ratio of reactants of 0.67:1. The reaction mixture was stirred at 250–271° C. for 15 minutes in an open vessel without a protective covering of inert gas or dry steam. Some fuming was observed. The reaction mixture changed in appearance from a yellowish fluid mass to a black granular solid. It was held at 270° C. for an additional 5 minutes and thereafter dumped into water and processed as in Example I. About 0.3 pound of a tarry residue was obtained during vacuum distillation of the hydroxyquinoline. The yield of refined 8-hydroxyquinoline was 66%.

I claim:
1. Method of making 8-hydroxyquinoline comprising admixing quinoline-8-sulfonic acid with sodium hydroxide containing a quantity of water sufficient to maintain said sodium hydroxide in a fluid state at the selected reaction temperature between 270–315° C. until the completion of the reaction, the weight ratio of said sodium hydroxide to quinoline-8-sulfonic acid being about 0.5–0.75:1, heating the reaction mixture at a temperature of 270–315° C. in an inert atmosphere until a finely divided dry powder is formed, and recovering 8-hydroxyquinoline from said powder.

2. Method of making 8-hydroxyquinoline comprising admixing quinoline-8-sulfonic acid with sodium hydroxide containing a quantity of water sufficient to maintain said sodium hydroxide in a fluid state at the selected reaction temperature between 270–315° C. until the completion of the reaction, the weight ratio of said sodium hydroxide to quinoline-8-sulfonic acid being about 0.5–0.75:1, heating the reaction mixture at a temperature of 270–315° C. in an inert atmosphere until a finely divided dry powder is formed, dissolving said powder in water, adjusting the pH of the solution thus formed to a pH of 8–8.5 with a strong mineral acid, and recovering 8-hydroxyquinoline from the resulting solution.

3. Method according to claim 2 wherein the 8-hydroxyquinoline is recovered from the acid-treated solution by extraction with a inert water-immiscible organic solvent and distillation of the solvent extract.

4. Method of making 8-hydroxyquinoline comprising admixing quinoline-8-sulfonic acid with aqueous sodium hydroxide containing about 70% by weight sodium hydroxide, the weight ratio of said sodium hydroxide to quinoline-8-sulfonic acid being about 0.6–0.7:1, heating the reaction mixture at a temperature of 290–310° C. in an inert atmosphere until a finely divided dry powder is formed, and recovering 8-hydroxyquinoline from said powder.

5. Method according to claim 4 wherein said inert atmosphere is dry steam.

6. In a method of making 8-hydroxyquinoline wherein quinoline-8-sulfonic acid is reacted with sodium hydroxide at an elevated temperature to form sodium quinolinate as an intermediate product, the improvement comprising providing in the reaction mixture a weight ratio of liquid sodium hydroxide to solid quinoline-8-sulfonic acid of 0.5–0.75:1, and heating the reaction mixture at a temperature of 270–320° C. in an inert atmosphere until a finely divided dry powder consisting essentially of sodium quinolinate is formed.

References Cited in the file of this patent
UNITED STATES PATENTS
2,489,530    Grier _____ Nov. 29, 1949